July 11, 1944.  E. G. REID  2,353,266
MOTOR VEHICLE
Original Filed Feb. 24, 1937  2 Sheets-Sheet 1
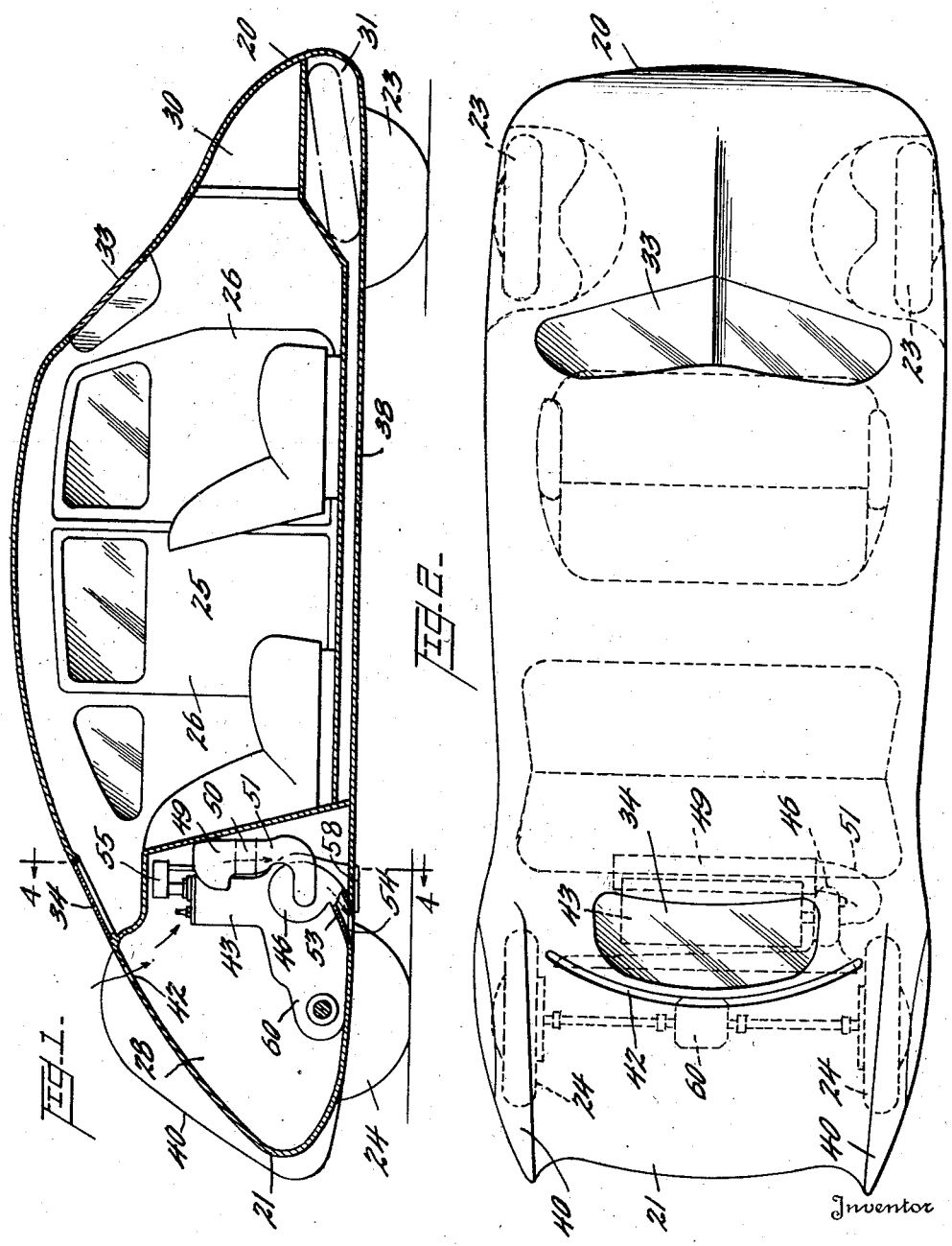
Inventor
Elliott G. Reid
By Watson, Cole, Grindle & Watson
Attorney July 11, 1944. E. G. REID 2,353,266
MOTOR VEHICLE
Original Filed Feb. 24, 1937   2 Sheets-Sheet 2
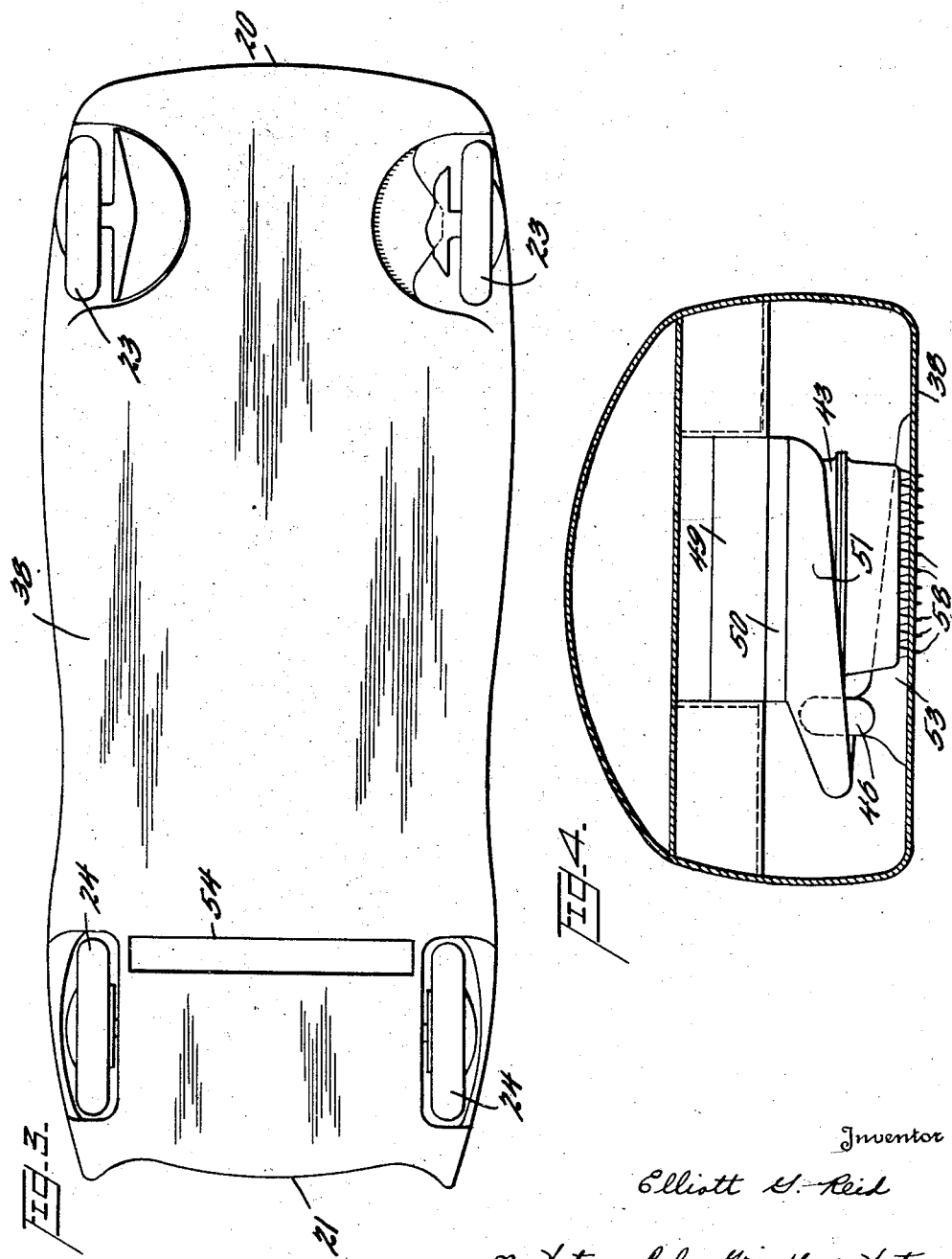
Inventor
Elliott G. Reid
By Watson, Cole, Grindle & Watson
Attorney Patented July 11, 1944

2,353,266

UNITED STATES PATENT OFFICE 2,353,266

MOTOR VEHICLE

Elliott G. Reid, Palo Alto, Calif., assignor to Packard Motor Car Company, Detroit, Mich., a corporation of Michigan Original application February 24, 1937, Serial No. 127,540. Divided and this application December 11, 1939, Serial No. 308,736

8 Claims. (Cl. 180—1)

This invention relates to motor vehicles and is more particularly concerned with improvements tending to reduce the wind resistance to movement of vehicle bodies. It is the principal object of the invention to provide a vehicle which is so modified with respect to existing vehicles as to materially improve the aerodynamic characteristics of the body while maintaining or improving upon present standards of over-all length, seating capacity, roominess of the body, comfort of the passengers and driver, and the accessibility of the body as regards ingress and egress.

The performance and economy characteristics of any self-propelled vehicle are primarily determined by the conditions of equilibrium between the power required and the power available for propulsion. Up to the present, improvements of automobile performance have been accomplished almost entirely by increasing the power available, and economy has suffered whenever the overall thermal efficiency of the power plant has not been correspondingly improved. For a variety of reasons, little attention has been paid to reducing the power requirements, although this is the only plan of attack which can lead to simultaneous improvements of both economy and performance, regardless of the progress of power plant development.

Although analysis reveals that major reductions of motor car air resistance would be of value at low as well as at high speeds, the potentialities of such aerodynamic refinement have not been realized because it has appeared, until now, that the requirements of low air resistance are incompatible with those of practical utility. The chief obstacle has been the generally accepted principle that the rear portion of a body must taper smoothly and gradually toward a point or edge if low resistance is to be attained. The conflict between this principle and the practical limitation of over-all length is obvious when one contemplates the conventional arrangement in which an engine of small cross-sectional area is located forward of a passenger compartment of large transverse dimensions. Although it might seem that the substitution of a rear engine arrangement would permit of considerable reduction of the over-all length required for an aerodynamically satisfactory body, practical considerations again intervene in such forms as passenger space limitations, difficulty of arranging for entrance and egress, head-on crash hazard, engine cooling problems, etc.

The present invention may be described as a new type of streamline, rear engine motor car in which a major reduction of air resistance has been effected without exceeding the highly important limitation of over-all length and without sacrificing any of the aforementioned qualities of practical importance. A number of the innovations which have made this possible, including the disposition of the principal components of the vehicle, the basic body form, the fins hereinbefore referred to and various other body features are dealt with more particularly in my co-pending application, Serial No. 308,737, filed concurrently herewith (Patent No. 2,284,988 dated June 2, 1942), and in my prior application, Serial No. 127,540, filed Feb. 24, 1937 (Patent No. 2,206,202 dated July 2, 1940), of which this and the co-pending application are divisions. The instant application is directed more particularly to a method of suppressed flow separation which may be described as "boundary layer control," and to such elements of the vehicle as are directly or indirectly associated with this method.

Although the existence of an adverse pressure gradient is a prerequisite to flow separation, it must be pointed out that separation actually does occur only when certain conditions have been established in the "boundary layer" of the flow. This designation is applied to that layer of fluid which is adjacent to a boundary surface and in which the velocity has been appreciably reduced by the action of skin friction. It has been experimentally demonstrated that separation may be prevented or suppressed by artificial control of the conditions in the boundary layer. One proven method is to remove the retarded fluid by the application of suction to slots in the boundary surface; another is to accelerate the retarded layer by discharging fluid tangentially along the surface.

All the mechanism necessary for the use of both of these methods is already available as an essential component of the conventional automobile power plant wherein engine cooling is effected through the radiation of heat to air which is circulated by a fan or blower. Heretofore, cooling has been the only function of this auxiliary. The present invention contemplates the use of slots in the upper surface of the body in the region between the fins for the intake of engine cooling air as well as the tangential discharge of this air through a rearwardly directed slot in the rear portion of the lower surface. Thus the fin action is supplemented by suction control of the upper surface boundary layer and separation of the flow from the upcurved lower surface is suppressed by the accelerating action of the discharged jet. It is thus apparent that this improvement of aerodynamic qualities is accomplished by the dual utilization of energy primarily required for another purpose.

It is also noteworthy that one of the effects of fin action is the augmentation of pressure in the region selected for the cooling air intake slot; this is advantageous because it is equivalent to reducing the load on the blower.

Since it is known that the elevation of a flap which constitutes the rear portion of an airplane wing reduces both the lift and resistance of that wing, a similar distortion may be expected to have like effects in the case of the automobile body. Since the possibility of flow separation exists in this region, the rearward discharge of cooling air for purposes of boundary layer control is considered an important adjunct to this feature.

Although the features described above have been devised primarily in effort to minimize air resistance, their use offers several important and heretofore unmentioned advantages over the conventional type and over other so-called streamline cars.

The location of the power plant behind the passenger compartment eliminates noise, engine fumes and the vibration of the conventional power transmission system. The mechanism for power transmission may be greatly simplified when the engine crankshaft is both close to and parallel to the driven axle. It is also important that the frontal area of the body and the height of the center of gravity of the car may be reduced by the lowering of the passenger compartment which becomes possible when the engine is located in the rear and no transmission mechanism is present beneath the floor.

Finally, engine cooling in hot weather is made somewhat less difficult than usual by the induction of air at some distance above the road surface. This is true because air temperatures are known to decrease rapidly with distance from the surface under most hot weather conditions.

Further objects and features of the invention will be apparent from the following description taken in connection with the accompanying drawings, in which—

Figure 1 is a central, vertical, longitudinal section of the vehicle;

Figure 2 is a plan view of the vehicle shown in Figure 1;

Figure 3 is a bottom plan of the vehicle; and

Figure 4 is a transverse section taken substantially on the line 4—4 of Figure 1.

For convenience in describing the invention, reference is made to the vehicle chosen for illustration in the accompanying drawings and specific language is employed. It will nevertheless be appreciated that the invention is not limited to this precise construction and arrangement; it will be apparent from the description and appended claims that various modifications of the several features referred to herein are contemplated as a part of the invention and that many of these features may be employed separately rather than in conjunction with the others with highly improved results.

The forward portion or nose of the vehicle is indicated in the drawings at 20, and the rearward portion or tail at 21, the forward steerable road wheels and the rear driving wheels being shown at 23 and 24 respectively. The vehicle body is preferably divided as shown into a number of compartments, including a generally centrally located passenger compartment 25 having conventional entrance and exit doors 26 therein, a rearwardly disposed motor compartment 28, and storage space in the vehicle nose including, for example, a luggage compartment 30 and a compartment 31 for receiving a spare tire, tools, or the like, the compartments in the nose and the engine compartment 28 being accessible through suitably disposed openings which are normally closed by hinged panels or the like. The forward windshield 33 may be in the shape of a flat V in horizontal section, being formed of two flat glass plates which are substantially flush with the adjacent body panel. While the contour of the vehicle may be smoothly curved in horizontal section at this point, curved windshield glass being employed, the difference in effect on the aerodynamic characteristics of the vehicle is negligible. At the rear of the vehicle, however, conditions are more critical and it is therefore preferable to employ a curved rear vision glass 34 conforming to the contour of the body panel at that point, the periphery of the glass being substantially flush with the adjacent panel.

The bottom of the vehicle is substantially completely enclosed by a lower panel 38 which affords a generally flat lower surface, this panel being inclined upwardly toward the rear in a smooth curve from a point somewhat forward of the rear axle, whereby the lift of the whole body is materially reduced with corresponding reduction of the induced drag. Both the induced drag and the form drag are materially reduced by depression of the vehicle nose.

In order that the over-all length of the vehicle will not materially exceed standard practice, the upper surface of the tail 21 is preferably sloped downward at a fairly steep angle, sufficiently steep to result in separation of continuous flow from the surface at a point well forward of the extreme rear of the tail in the absence of special precautions for reasons hereinbefore more fully set forth. To avoid this very serious impairment of the aerodynamic efficiency of the vehicle, fins 40 are provided at each side of the body, these fins forming continuations of and merging into the adjacent portions of the body. In general, the fins will function satisfactorily if they are so formed and positioned that the transverse components of the resultant air forces act thereon in an outward direction, i. e., away from the central, vertical, longitudinal plane of the vehicle as explained more fully in my prior application, above identified.

The fins 40 perform the further function, by reason of their action in increasing the pressure over the vehicle tail, of facilitating the introduction of air through the transversely disposed slot or opening 42 in the upper tail surface, this air being necessary for the cooling of the engine 43 which is located within the rear compartment 28. At the same time, as hereinbefore set forth, the flow of air into this compartment from the upper surface of the tail effects removal of retarded fluid at this critical point and further aids in the establishment of a smooth flow over the tail. The form and location of the opening 42 may be varied to a considerable extent; although it is preferable to withdraw the air from the forward portion of the tail, rearward location of the intake is reasonably effective and several distributed openings may be employed. It will also be understood that the instant invention contemplates the employment of this method of facilitating air flow by the withdrawal of air from the exterior surface of the vehicle body at various other points, and either in conjunction with or wholly apart from fins of the character described herein.

It will be appreciated that there is, despite the effect of the fins in increasing the air pressure adjacent the opening 42, decidedly less pressure applied to the engine air intake than is afforded by the full impact pressure on the nose radiator of a modern vehicle of conventional type. It is therefore highly desirable to employ an efficient blower for increasing the rate of air flow through the radiator in the instant construction. This blower may be of the Sirocco type, such as is indicated at 46, and may be mounted on one end of the engine crankshaft, as shown more particularly in Figures 1 and 4, or may be driven therefrom in any convenient manner, for instance by means of a pulley on the crankshaft.

The air passing through the opening 42 may flow downwardly and forwardly about and over the engine block and toward and through the radiator 50. A casing 49 which is open at the top and rear directs the air into the radiator at the upper side of the latter, the air flowing downwardly through the radiator, into a conduit 51 to the blower 46, and thence through a discharge conduit 53 which communicates with a transversely extending opening 54 in the lower panel of the vehicle body. Preferably, the conduit 53 and opening 54 are so arranged that the air is discharged substantially tangentially to the lower panel. Thus the air flow beneath and at the rear of the vehicle is accelerated to suppress separation of flow from the upwardly curving lower surface of the vehicle as herebefore explained. An expansion tank 55 may communicate with the radiator and any suitable provision may be made for filling the radiator, for example, a filling tube extending to a convenient point on the exterior of the body may be used.

Cooling fins 58 are preferably formed integrally with the lower engine pan and extend downwardly through the panel 38, being disposed in planes parallel to the direction of flow of air so as to offer minimum resistance. By this or some equivalent means the engine oil can be maintained at a satisfactory temperature although the engine is otherwise entirely enclosed within the body, and the use of unsightly louvres tending to decrease the aerodynamic efficiency of the vehicle is avoided.

It will be observed that the engine 43 extends transversely of the vehicle and is preferably the type in which the cylinders are arranged in line so as to occupy a minimum of space in the direction of the length of the vehicle to permit the rear of the body to be brought down severely, although a V-type engine may be used. The rear road wheels 24 are driven in any suitable manner from the engine 43 through gearing disposed within a housing 60, which gearing will preferably include the usual change speed transmission gearing and the conventional differential gearing, and the road wheels 24 may be supported for rising and falling movement in any desired manner.

By the employment in a vehicle of the more important features disclosed in this and related applications, it has been found possible to reduce the air resistance to less than one-third of that of the conventional modern car without violating present standards of over-all length, ground clearance, overhang beyond the road wheels, maximum width, convenient and comfortable seating, accessibility, and directional stability in cross winds. One of the most important factors in this accomplishment is the reduction of induced drag brought about by the suppression of lift. The depressed nose, the up-swept rear lower surface and the twin fins which experience outwardly directed air forces, as well as the method of boundary layer control with which this application is more particularly concerned, all contribute materially toward this end. It is believed that the present invention constitutes the first example of intentional application to motor car construction of the aerodynamic principle of drag reduction through lift suppression.

Having thus described the invention, what is claimed as new and desired to be secured by Letters Patent is:

1. In a motor vehicle having a body formed to provide a passenger compartment and a rearwardly disposed engine compartment beneath a continuously downwardly sloping upper rear panel, an intake for engine cooling air in said panel, and means associated with said panel for so directing air thereover as to materially increase the pressure on that portion of the panel area in which said intake is located.

2. In a motor vehicle having a body formed to provide a passenger compartment and a rearwardly disposed engine compartment beneath a continuously downwardly sloping upper rear panel, an intake for engine cooling air in said panel, whereby air is continuously removed from the surface of said panel to promote smooth flow thereover, and means for circulating said cooling air in said engine compartment and discharging the same tangentially of and beneath the body in a rearward direction.

3. In a motor vehicle, the combination with a vehicle body including a generally flat and uninterrupted lower surface, of means for discharging fluid along said surface and in the direction of air flow thereover to accelerate such flow and thereby to suppress flow separation therefrom, said means comprising a discharge outlet for gaseous fluid in said surface, said outlet being formed to direct the gaseous fluid substantially tangentially of said surface and in the direction of air flow.

4. A motor land vehicle body having an upper external surface sloping downwardly toward the rear from a point intermediate the ends thereof, said body being formed to provide generally longitudinally directed, upstanding fins, one at each side of said sloping surface, said fins being so shaped and disposed that when air flows longitudinally of and over the body, the transverse components of the resultant air forces which act upon the fins will be directed outwardly, whereby the tendency of the flowing air to separate from said surface is minimized, said surface having an air inlet opening therein through which air may be removed from adjacent said surface to further reduce the tendency toward air flow separation, said fins being so shaped and disposed with relation to said opening as to materially increase the air pressure adjacent said opening and thereby to promote the movement of air into the opening.

5. In a motor vehicle, the combination with a vehicle body including a generally flat and uninterrupted lower surface which is curved upward slightly adjacent the rear of the vehicle, of means disposed forward of at least part of the upwardly curved portion of said surface for discharging fluid along said surface and in the direction of air flow thereover to accelerate such flow and thereby to suppress flow separation therefrom.

6. A motor vehicle body having a continuously downwardly sloping upper rear panel and a generally flat and uninterrupted lower surface, means associated with said body for withdrawing air from the external surface of said panel to suppress separation of air flow therefrom, and for discharging the air thus withdrawn tangentially of and beneath the body in a rearward direction.

7. A motor vehicle body having a continuously downwardly sloping upper rear panel, means associated with said body for withdrawing air from the external surface of said panel to suppress separation of air flow therefrom, and means associated with said panel for so directing the air thereover as to increase materially the pressure on that portion of the panel area from which the air is withdrawn.

8. A motor vehicle body having a continuously downwardly sloping upper rear panel and a generally flat and uninterrupted lower surface, means associated with said body for withdrawing air from the external surface of said panel to suppress separation of air flow therefrom, and for discharging the air thus withdrawn tangentially of and beneath the body in a rearward direction, and means associated with said panel for so directing the air thereover as to increase materially the pressure on that portion of the panel area from which the air is withdrawn.

ELLIOTT G. REID.